United States Patent
Tsui et al.

(10) Patent No.: US 6,786,669 B2
(45) Date of Patent: Sep. 7, 2004

(54) POSITIVE LOCK QUICK RELEASE PIN

(75) Inventors: Walter Tsui, Huntington Beach, CA (US); J. Steve Mills, Orange, CA (US); James M. Snyder, La Habra, CA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 10/094,548

(22) Filed: Mar. 8, 2002

(65) Prior Publication Data

US 2003/0170071 A1 Sep. 11, 2003

(51) Int. Cl.⁷ .................................................. B25G 3/18
(52) U.S. Cl. ............................. 403/322.2; 403/109.2; 403/109.3; 403/379.5; 403/DIG. 4; 403/DIG. 6
(58) Field of Search .......................... 403/109.2, 109.3, 403/322.2, DIG. 4, DIG. 6, 82, 116, 348, 359.6, 379.5, 154

(56) References Cited

U.S. PATENT DOCUMENTS

| | | | |
|---|---|---|---|
| 3,277,767 A | * | 10/1966 | Allen ....................... 403/322.2 |
| 3,936,203 A | | 2/1976 | Lowder et al. |
| 5,100,256 A | | 3/1992 | Estep |
| 5,233,770 A | | 8/1993 | Robinson |
| 5,437,515 A | | 8/1995 | Kuramoto et al. |
| 5,772,355 A | | 6/1998 | Ross et al. |
| 6,152,645 A | | 11/2000 | Sanford |
| 6,158,917 A | | 12/2000 | Wolin et al. |

* cited by examiner

Primary Examiner—Lynne H. Browne
Assistant Examiner—Victor MacArthur
(74) Attorney, Agent, or Firm—Artz & Artz, PC

(57) ABSTRACT

A positive lock quick release pin for locking a plurality of objects together includes a handle portion which is in communication with a handle housing. The handle housing has an interior cavity within which a shaft member is disclosed. The pin also includes a ball retention mechanism located in the handle portion that is moveable between a locked position where the mechanism extends outwardly of an opening formed in the handle housing and an unlocked position where the ball mechanism extends no further than the outer edge of the opening. The ball retention mechanism is moved between the locked position and the unlocked position by reciprocation and rotation of the shaft member within the handle housing.

10 Claims, 1 Drawing Sheet

POSITIVE LOCK QUICK RELEASE PIN

TECHNICAL FIELD

The present invention relates generally to connecting pins that are used to secure two or more objects together.

BACKGROUND OF THE INVENTION

A variety of positive lock pins are well known in the art. Positive lock pins are typically utilized to quickly install a secure connector in a joint or other location to thereby lock two or more objects together.

One known positive lock pin that is widely utilized is generally referred to as a pip-pin. As is known, pip-pins are typically used to lock two or more objects together in applications where a clamping force is not needed. The locking function of these pip-pins is accomplished through the utilization of a protruding ball lock mechanism. As is known, the ball lock mechanism is comprised of a pair of balls that are positioned to communicate with holes in opposing sides of the pip-pins. Each of the pair of balls extends outwardly through a respective hole such that its outermost portion extends beyond the diameter of the pip-pin. In this locked position, the balls prevent the pip-pin from being removed from the hole into which it inserted. To remove the pip-pins, the ball lock mechanism is retracted which allows the pip-pin to be removed from the hole into which it is inserted.

One known application for these pip-pins includes the attachment of Ground Support Equipment together with associated flight hardware. Another known application for these pip-pins is for the International Space Station where they are used to assemble mechanisms and truss structures in space. These pip-pins have applications that are both temporary and permanent. In either event, current pip-pins have a reliability problem where the balls, which form part of the locking mechanism, can fall outwardly through the hole and therefore become detached from the pin. Obviously, if the balls fail, the retention capability of the pip-pins is diminished. Further, the loose balls can contaminate critical hardware and may cause malfunction.

One of the principal reasons that the ball mechanisms fail is due to vibration forces that act on the pip-pins. With current pip-pins, the ball devices are swaged into place to provide a retention mechanism for the pin. Because the ball devices are swaged into the holes from the outside, the large vibrations and forces that act on the pip-pins, due to the applications in which the pip-pins are employed, can cause the ball devices to fall out of the holes. As is known, the swaging process provides relatively weak retention capabilities. Accordingly, efforts have been made to increase the retention capabilities of these balls, including by increasing the amount of swaging of the ball devices. This increased swaging, however, decreases the amount of retention capability of the pin. This is because, by increasing the amount of swaging, the ball devices protrude out of the pin a lesser distance. This increased swaging further requires the diameter of the hole in which the pip-pin is placed to be machined to tighter tolerances in order to insure retention of the pip-pin in the hole.

Because of the unreliability of these pip-pins, they must be frequently replaced and/or repaired when failed. This increases the cost of the pip-pins as well as the associated service costs. Moreover, if the pip-pins fail altogether, this failure can have a more significant impact on the application in which they are being utilized.

SUMMARY OF THE INVENTION

It is therefore an object of the present invention to provide a positive lock quick release pin that provides increased retention capabilities.

It is another object of the present invention to provide a positive lock quick release pin that has improved reliability.

It is still another object of the present invention to provide a positive lock quick release pin that requires less installation time.

It is a further object of the present invention to provide a positive lock quick release pin that allows for easier inspection to determine the propriety of its installation In accordance with the above and the other objects of the present invention, a positive lock quick release pin is provided. The positive lock pin is intended to lock a plurality of objects together and includes a handle portion. The handle portion has a handle housing in communication therewith. The handle housing has a shaft member disposed therein, which is reciprocal and rotational with respect to the handle housing. The handle housing has at least one ball retention mechanism disposed therein, which is in communication with an opening formed in the shaft member. The at least one ball retention mechanism is moveable between a locked position and an unlocked position. In the locked position, the at least one ball retention mechanism extends outwardly from the outer surface of the pin. In the unlocked position, the outermost portion of the at least one ball retention mechanism is located inwardly of the outer surface of the pin. The at least one ball retention mechanism is moved between the unlocked position and the locked position by reciprocal movement and/or rotation of the shaft member with respect to the handle housing. The at least one ball retention mechanism has a base portion secured thereto. The base portion is larger than the opening to prevent the at least one ball retention mechanism from falling out the opening and becoming detached from the pin.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
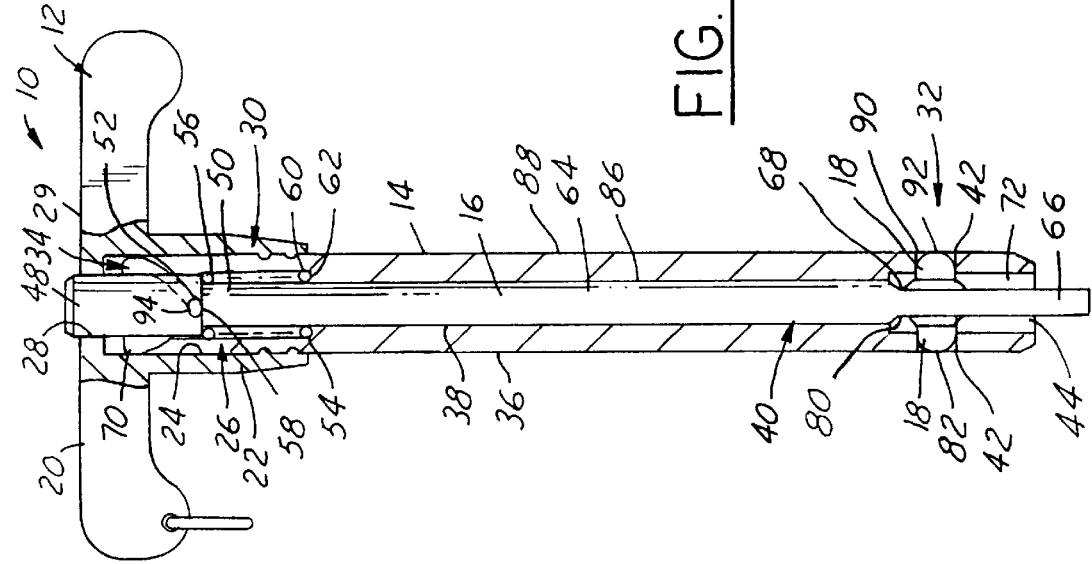
FIG. 1 is a cross-sectional view of a positive lock quick release pin in a locked position in accordance with a preferred embodiment of the present invention.
Figure 2:
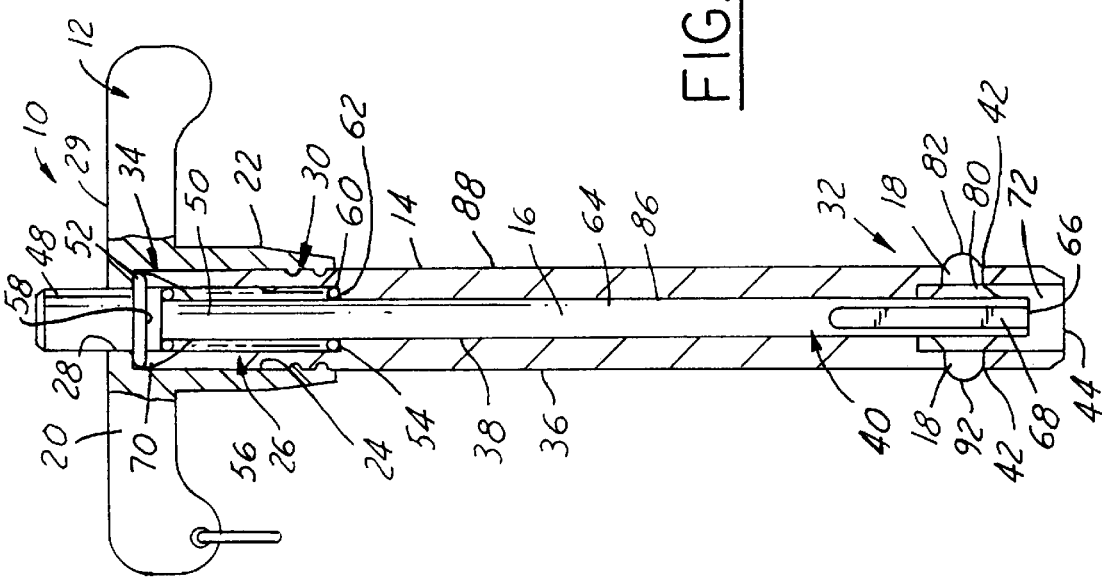
FIG. 2 is a cross-sectional view of a positive lock quick release pin in an unlocked position in accordance with a preferred embodiment of the present invention.

Referring now to FIGS. 1 and 2, a quick release pin 10 is illustrated. The pin 10 is preferably intended to be utilized to lock a plurality of objects together. It will be understood that the pin 10 can be utilized in a variety of applications, including both temporary and permanent installations. Moreover, the pin 10 is preferably utilized shear in applications where a clamping force is not necessary and can be sized to lock any number of objects together. The terms "upward" and "downward" are used herein for directional orientation with respect to the drawings. These directional terms are not intended to be construed as limiting the orientation of the pin 10 when in use.

The pin 10 includes a handle portion 12, a handle housing 14, a shaft member 16, and a pair of ball retention mechanisms 18. The handle portion 12 is generally t-shaped or button shaped and has an upper portion 20 and a downwardly extending flange portion 22. The flange portion 22 is preferably generally cylindrical in shape and has an interior surface 24 that defines a hollow interior portion 26. The hollow interior portion 26 extends upwardly such that a portion of the hollow interior portion 26 is located in the upper portion 20. The upper portion 20 has an opening 28 formed in a top surface 29 of the upper portion 20.

The handle housing 14 is preferably generally cylindrical in shape and has an upper portion 30 and a lower portion 32. The upper portion 30 is preferably telescopically disposed in the hollow interior portion 26 and has an open top end 34. The handle housing 14 is preferably secured to the handle portion 12 by swaging and is oriented to extend in generally perpendicular fashion with respect to the handle portion 12. However, the handle portion 12 and the handle housing 14 may be secured by a variety of other suitable methods. Alternatively, the handle portion 12 and the handle housing 14 may be integrally formed as a single piece. The handle housing 14 has an exterior surface 36 and an interior surface 38, which defines a cavity portion 40 within the handle housing 14. The lower portion 32 of the handle housing 14 has a pair of openings 42 formed therethrough. The lower portion 32 has an open bottom end 44.

The shaft member 16 is disposed within the cavity portion 40. The shaft member 16 has a button portion 48 formed at an upper end 50 thereof. The button portion 48 is sized to telescopically engage the opening 28 in the top surface 29 of the upper portion 20. The upper end 50 of the shaft member 16 has a pin 52 formed thereon. The pin 52 is preferably disposed on the shaft member 16 in a generally horizontal direction, i.e., perpendicular to the shaft member 16. The pin 52 preferably rests inside a pair of spiral grooves 70 formed in the handle housing 14. The pin 52 preferably has a round shape and has at least one dimension, such as its length, which is larger than the diameter of the opening 28 to allow only the button portion 48 to pass through the opening 28 in the top surface 29. However, the pin 52 may take on a variety of other shapes.

The upper portion 20 of the shaft member 16 has a spring 54 disposed therearound, which is preferably located below the generally horizontal pin 52. The spring 54 has an upper portion 56 that engages an underside 58 of the pin 52 and a lower portion 60 that rests on a shoulder 62 formed in the interior surface 38 of the handle housing 14. The shoulder 62 is formed by an increase in the diameter of the interior surface 38 of the upper portion 30 adjacent the upper end 50 of the shaft member 16. As will be understood, the spring 54 engages the underside 58 of the pin 52 and biases it upward towards the opening 28, such that the button portion 48 extends through the opening 20. When the button portion 48 is moved downward, the pin 52 compresses the spring against the shoulder 62, as is discussed further below. As discussed above, the pin 52 is preferably in communication with the pair of grooves 70 that are formed in the handle housing 14. The pair or grooves 70 extend generally downwardly in a circumferential direction.

The shaft member 16 has a middle portion 64 that extends downwardly from the upper end 50. The middle portion 64 terminates at a lower end 66. The lower end 66 of the shaft member 16 has a pair of recess 68 formed therein. The pair of recesses are preferably formed in the shaft member 16 such that they are disposed approximately 180° apart or opposite one another on the shaft member 16. The lower end 66 of the shaft member 16 can pass through the open bottom end 44 of the handle housing 14 when the button portion 48 is depressed against the spring 54. The shaft member 16, including the button portion 48, the upper end 50, the middle portion 64, and the lower end 66 are preferably a single integral unit. However, the shaft member 16 may take on other forms and may be comprised of multiple pieces.

The pair of ball retention mechanisms 18 are located in a lower portion 72 of the cavity portion 40. The lower portion 72 of the cavity 40 has a larger diameter than the diameter of the cavity portion 40 in which the middle portion 64 of the shaft is disposed. Each of the pair of ball retention mechanisms 18 has a base or flange portion 80 and a ball portion 82. The base portion 80 is preferably integrally formed with the ball portion 82. The ball retention mechanisms 18 are located such that each of the ball portions 82 is received in one of the pair of openings 42 formed in the handle housing 14. The base portion 80 of each ball portion 82 has a diameter or other dimension that prevents either ball retention mechanism 18 from falling out of their respective opening 42 and thus becoming disassociated with the pin 10. The openings 42 and thus the ball retention mechanisms 18 are preferably located approximately 180° apart or on opposing portions of the shaft member 16.

As shown in FIG. 1, the pin 10 is illustrated in a locked position, such as after it has been installed to hold two or more objects together. In the locked position, the button portion 48 is biased upward to its fully extended position by the spring 54. In this configuration, the generally horizontal pin 52 is located in its initial position at the upper portion of the groove 70. Further, when the pin 10 is in the locked position, the spring 52 is in its normal unbiased position. Each of the ball retention mechanisms 18 have their base portions 80 in communication with the outer surface 86 of the shaft member 16. By this configuration, the ball portions 82 are forced outwardly through their respective openings 42 such that the ball portions 82 protrude beyond the outer surface 88 of the handle housing 14. The ball portions 82 extend out far enough such that they give the pin 10 an effective diameter as measured from their respective outermost point 92 that is larger than the hole through which the pin 10 was inserted, thereby preventing the pin 10 from being removed and maintaining the locking function of the pin 10.

Referring now to FIG. 2, which illustrates the pin 10 in a released position. In the released position, the pin 10 can be inserted into a hole to lock two or more objects together or may be removed from a hole to unlock the plurality of objects from one another. To move the pin 10 to the released position, the button portion 48 is depressed against the force of the spring 54. As the button portion 48 is moved downward, the entire shaft member 16 moves downward and causes the pin 52 to move downward on the groove 70. Because the groove 70 is configured downwardly and inwardly, the pin 52, which follows the groove 70 begins to rotate, as will be understood by one of skill in the art. The rotation of the pin 52 causes the shaft member 16 to rotate. This rotation preferably continues until the pin 52 is rotated about 90°, with the end portion 94 of the pin 52 now facing outward as shown in FIG. 2.

This rotation of the pin 52 and the shaft member 16 brings the pair of recesses 68 formed in the shaft member 16 into communication with the base portions 80 of each of the ball retention mechanisms 18. As the outer portion 86 of the shaft member 16 is no longer forcing the ball retention mechanisms 18 outwardly, the pair of openings 42, which have outlets 90 that are generally radiused, force the ball portions 82 inwardly, such that the base portions 80 are received in the respective recesses 68 in the shaft member 16. In this configuration, the outermost point 92 of the ball portions 82 reside within the openings 42 and, in any event, no further outwardly than the outer surface 88 of the handle housing 14. The open bottom end 44 of the handle housing 14 allows a portion of the shaft member 16 to extend therethrough when the pin 10 is being moved downward and when it is in the unlocked position. From the unlocked position, it will be understood that the pin 10 is returned to the locked position by the force of the spring 54.

In accordance with another preferred embodiment, the ball retention mechanisms 18 may be moved between the locked and the unlocked position by only the rotation of the shaft member 16. In this configuration, the shaft member 16 would merely be rotated to bring the recesses 68 into and out of communication with the base portions 80. Similarly, the ball retention mechanism 18 can be moved between the locked and the unlocked position solely by reciprocal movement of the shaft member 18. In this configuration, the recess 68 would be smaller in size and would be located above the ball retention mechanism 18 in the locked position and moved downwardly to receive the base portions 80 therein in the unlocked position.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. A positive lock pin for locking a plurality of objects together, comprising:

a handle portion;

a handle housing in communication with said handle portion;

a shaft member located within said handle housing, said shaft member having at least one recess formed therein, wherein said shaft member is also rotatable to bring said at least one recess into communication with said at least one ball retention mechanism, and wherein said shaft member urges said at least one ball retention mechanism outwardly when the pin is in said locked position and said at least one ball retention mechanism engages said at least one shaft member recess when the pin is in said unlocked position; and at least one ball retention mechanism disposed within said handle housing and in communication with said shaft member, said at least one ball retention mechanism being in communication with an opening formed in said handle housing and being moveable between a locked position where an outermost portion of said at least one ball retention mechanism extends outwardly from said opening and an unlocked position wherein said outermost portion of said at least one ball retention mechanism does not extend outwardly from said opening and a base portion of said at least one ball retention mechanism is received in said at lease one recess;

said at least one ball retention mechanism being moveable between said locked position and said unlocked position by reciprocal movement of said shaft member; and a horizontal pin secured to an upper end of said shaft member, wherein said handle housing has at least one groove formed therein in communication with said horizontal pin to effectuate rotation of said shaft member so as to move said at least one recess into and out of communication with said at least one ball retention mechanism.

2. The lock pin of claim 1, wherein said at least one ball retention mechanism comprises: a pair of ball retention mechanisms disposed within said handle housing and moveable between said locked position and said unlocked position.

3. The lock pin of claim 1, further comprising:

a flange portion secured to said ball retention mechanism, said flange portion having a larger dimension than the largest dimension of said opening in order to prevent said ball retention mechanism from falling our of said opening.

4. The lock pin of claim 1, wherein said shaft member includes a button portion that extends upwardly above said handle portion allowing said shaft member to be moved downwardly to move said horizontal pin on said at least one groove and thereby allowing said shaft member to rotate.

5. The lock pin of claim 4, further comprising:

a spring disposed a round said upper portion of said shaft member to bias said shaft member upwardly.

6. A quick release positive lock pin for locking a plurality of objects together, comprising:

a handle portion in communication with a generally downwardly extending handle housing:

a shaft member disposed within a cavity formed in said handle housing wherein said shaft member includes a button portion that protrudes above said handle portion and allows said shaft portion to be moved linearly within said handle housing;

a generally horizontal pin secured to an upper end of said shaft member, said horizontal pin being in communication with at least one groove formed in said cavity; and a pair of ball retention mechanisms disposed within said handle housing, each of said ball retention mechanisms in communication with a respective opening formed in said handle housing to move between a locked position and an unlocked position by rotational movement of said shaft member, wherein said at least one groove extends downwardly and inwardly causing said horizontal pin to rotate as said shaft member is moved downwardly as said horizontal pin travels on said at least one groove.

7. The lock pin of claim 6, wherein each of said pair of ball retention mechanisms and said associated pair of openings are located on opposite sides of the pin.

8. The lock pin of claim 7, wherein said shaft member includes a pair of recesses which are located on opposite ends of said shaft member each of said pair of recesses being moveable into and out of communication with a respective one of said pair of ball retention mechanisms.

9. The lock pin of claim 8, wherein said shaft member has a pair of solid portions bridging said pair of recesses to urge each of said ball retention mechanisms outwardly through a respective one of said openings to place the pin in said locked position.

10. The lock pin of claim 9, wherein each of said ball retention mechanisms is intended to engage one of said recesses to place the pin in said unlocked position.

* * * * *